US008997218B2

(12) United States Patent
Hentunen

(10) Patent No.: US 8,997,218 B2
(45) Date of Patent: Mar. 31, 2015

(54) DETECTING A RETURN-ORIENTED PROGRAMMING EXPLOIT

(75) Inventor: Daavid Hentunen, Helsinki (FI)

(73) Assignee: F-Secure Corporation, Helsinki (FI)

( * ) Notice: Subject to any disclaimer, the term of this patent is extended or adjusted under 35 U.S.C. 154(b) by 524 days.

(21) Appl. No.: 12/928,905

(22) Filed: Dec. 22, 2010

(65) Prior Publication Data

US 2012/0167120 A1    Jun. 28, 2012

(51) Int. Cl.
*G06F 21/00*     (2013.01)
*G06F 21/54*     (2013.01)
*G06F 21/57*     (2013.01)

(52) U.S. Cl.
CPC .............. *G06F 21/54* (2013.01); *G06F 21/577* (2013.01)
USPC ............................................. 726/22; 726/25

(58) Field of Classification Search
USPC ..................................................... 726/22–26
See application file for complete search history.

(56) References Cited

U.S. PATENT DOCUMENTS

| 7,272,748 | B1 | 9/2007 | Conover et al. ............... 714/20 |
| 7,287,283 | B1 * | 10/2007 | Szor ............................. 726/26 |
| 8,190,752 | B1 * | 5/2012 | Xia ............................... 709/229 |
| 2007/0043551 | A1 * | 2/2007 | Ezra et al. .................... 703/26 |
| 2007/0083813 | A1 * | 4/2007 | Lui et al. ..................... 715/709 |
| 2008/0016314 | A1 * | 1/2008 | Li et al. ....................... 711/200 |
| 2009/0249289 | A1 * | 10/2009 | Akritidis et al. ............. 717/108 |

OTHER PUBLICATIONS

"Fundamental of Windows", Abhishek Singh, Identifying Malicious Code Through Reverse Engineering Advances in Information Security, 2009, vol. 44, 1-40, DOI: 10.1007/978-0-387-89468-3_2, pp. 1-40.*
"Analysis of GS protections in Windows Vista", Ollie Whitehouse, Symantec Advanced Threat Research, 2007, Symantec Corporation, pp. 1-32.*
"Security Mitigations for Return-Oriented Programming Attacks", P. Bania, http://packetstormsecurity.org/papers/general/ROP_Whitepaper.pdf., 2010, 8 pgs.
"Learn more at National Vulnerability Database (NVD)", Common Vulnerabilities and Exposures, CVE-2010-2883, Dec. 2010, 2 pgs.
Chen, P. et al.; "Efficient Detection of the Return-Oriented Programming Malicious Code"; 2010; pp. 140-155; ICISS 2010, LNCS 6503; Springer-Verlag Berlin Heidelberg.
Chen, P. et al.; "DROP: Detecting Return-Oriented Programming Malicious Code"; 2009; pp. 163-177; ICISS 2009, LNCS 5905; Springer-Verlag Berlin Heidelberg.
Shacham, H.; "The Geometry of Innocent Flesh on the Bone: Return-into-libc without Function Calls (on the x86)"; Oct. 29-Nov. 2, 2007; pp. 552-561; CCS 07, Alexandria, Virginia.
Krahmer, S.; "x86-64 buffer overflow exploits and the borrowed code chunks exploitation technique"; Sep. 28, 2005; pp. 1-20.
Nergal; "The advanced return-into-lib(c) exploits: PaX case study"; Dec. 28, 2001; whole document; Phrack Magazine, vol. 0x0b, Iss. 0x3a, Phile #0x04 of 0x0e.

* cited by examiner

*Primary Examiner* — Edward Zee
*Assistant Examiner* — Chi Nguy
(74) *Attorney, Agent, or Firm* — Harrington & Smith

(57) ABSTRACT

A method and apparatus for detecting a Return-Oriented Programming exploitation. At a computer device, a mechanism to detect a control transfer of a code location in a memory is established. This may be, for example, hooking the control transfer. The code location relates to an electronic file. In the event that a control transfer of the code location is detected, a comparison is made between a destination code location address with values in the freed stack. If the code location address matches any of the values in the freed stack, then it is determined that the control transfer of the code location relates to a Return-Oriented Programming exploitation.

17 Claims, 3 Drawing Sheets

DETECTING A RETURN-ORIENTED PROGRAMMING EXPLOIT

TECHNICAL FIELD

The present invention relates to the field of detecting a Return-Oriented Programming Exploit.

BACKGROUND

Data Execution Prevention (DEP) is a feature used by some operating systems, including Microsoft Windows® that is used to reduce the risks of exploits that rely on, for example, storing code to stack or heap memory locations that normally do not contain executable code. DEP typically works by marking some regions of a computer readable memory as "non-executable". This ensures that those regions can only store data that are recognized as being non-executable. A successful exploitation is therefore rendered less likely to happen as it may try to run code from a region of the memory that is marked as non-executable. The operating system detects this and prevents the code from being executed.

In order to attempt to bypass DEP, some forms of exploit use Return-Oriented Programming (ROP). In one example, the exploit relies on overwriting a return address in the memory stack that has called by a valid application so that it points to code other than code associated with the normal application execution path. This code can be used for malicious purposes. An additional portion of the stack is overwritten that allows the exploit to call pre-existing functions without needing to inject malicious code into the program. This type of attack only uses existing executable code. ROP exploits can be used to chain individual small attacks. In other words, the stack memory is used indirectly to execute previously selected instructions (referred to as gadgets). Each gadget typically ends with the x86 subroutine return instruction (RET), which transfers the execution to the next gadget or to the payload. As all of the executed instructions are executed from executable memory areas within the original application, DEP is ineffective. The gadgets typically include code that is equivalent to calling a VirtualProtect API to enable execution rights for the memory page where the payload resides, which effectively renders DEP ineffective.

There are several mechanisms designed to protect against an ROP exploit, which are described in detail in P. Bania, "Security Mitigations for Return-Oriented Programming Attacks".

A technique to address ROP exploits is Address Space Layout randomization (ASLR). ASLR randomly arranges locations in the memory at which data such as executable files and libraries are stored. This makes it more difficult for an ROP exploit to predict a target address. For example, an ROP exploit must locate the code to be executed, which requires knowledge of the memory address of the code. ASLR takes advantage of the low probability of an exploit knowing where regions of the memory are randomly located. For an exploit to be successful, it must know the locations of all required regions of the memory, which is extremely unlikely.

However, not all software applications have executables and libraries that can make use ASLR, and so these are more vulnerable to ROP exploitation. An example of an occurrence of this type is described in Common Vulnerabilities and Exposures number CVE-2010-2883, where the ROP exploit evaded the DEP.

SUMMARY

It is an object of the invention to reduce the risk of a successful ROP DEP evasion in a situation in which a resource such as a library or executable does not use ASLR. According to a first aspect of the invention, there is provided a method of detecting an ROP exploitation of an application. At a computer device, a hooking rule is established to hook a code location relating to an electronic file stored in a computer readable medium in the form of a memory. In the event that a control transfer of the code location is detected, a comparison is made of the code location address and values stack space freed by the control transfer. In the event that the code location address and any of the values in the freed stack match, it is determined that the control transfer relates to an ROP exploitation. In this case, action may be taken to address the ROP exploitation.

As an option, a function has a stack pointer, and the hooking is performed so as maintain the same value for the stack pointer.

As an option, the comparison of the code location address is made with one of a location address for a first value in the freed stack space and a location address for a second value in the freed stack space.

As a further option, the comparison of the code location address is made with one of a number of location addresses for values in the freed stack space. In this case, the method optionally further comprises estimating a number of location addresses to be compared with the return address.

The estimate is optionally performed by determining a set of electronic files to inspect and disassembling each electronic file to analyse functions related to each electronic file. A number of parameters related to each function is determined, and a determination is made of the function having the highest number of parameters. The number of parameters for the function with the highest number of parameters is used as the estimate for the number of location addresses to be compared with the return address.

As an alternative option, the estimation is performed by determining a set of electronic files to inspect and disassembling each electronic file to analyse functions related to each electronic file. Each function is disassembled to find return instructions and associated parameters. A determination is made of the function having the highest number of parameters associated with return instructions. The number of parameters for the function having the highest number of parameters associated with return instructions is used as the estimate for the number of location addresses to be compared with the return address.

As an option, the method further comprises, before to establishing a hooking rule to hook a function relating to an electronic file, determining that the electronic file does not use Address Space Layout Randomization (ASLR). As described above, ASLR makes it more difficult for an ROP exploit to predict a target address, so an additional form of detection may not be necessary in all cases. In an optional embodiment, the step of determining that an electronic file stored in a computer readable medium in the form of a memory does not use ASLR comprises determining whether the electronic file was compiled using a /DYNAMICBASE linker option.

As a further option, the method comprises taking action to prevent the ROP exploitation.

According to a second aspect, there is provided a method of detecting a Return-Oriented Programming exploitation. At a computer device, a mechanism to detect a control transfer of a code location in a memory is established. The code location relates to an electronic file. In the event that a control transfer of the code location is detected, a comparison is made between a destination code location address with values in the freed stack. If the code location address matches any of the values in the freed stack, then it is determined that the control transfer of the code location relates to a Return-Oriented Programming exploitation.

As an option, the mechanism to detect a control transfer of a code location comprises marking the code location relating to the electronic file as not being present in the memory, and detecting an exception error when the control transfer attempts to transfer the code location to a memory location.

Alternatively, the mechanism to detect a control transfer of a code location optionally comprises marking the code location relating to the electronic file as not being executable and detecting an exception error when the control transfer attempts to transfer the code location to a memory location.

According to a third aspect, there is provided a computer device. The computer device is provided with a computer readable medium in the form of a memory. At least one electronic file is stored at the memory. A hooking function is provided for establishing a hooking rule to hook a code location relating to the electronic file. An ROP exploitation detection function is also provided for comparing a code location address with a value in the stack space freed by a control transfer and, in the event that the code location address and any of the values in the freed stack match determining that the function relates to a ROP exploitation.

As an option, the computer device is also provided with an application checking function for determining that the electronic file does not use ASLR.

The ROP exploitation detection function of the computer device is optionally arranged to compare the code location address with one of a location address for a first value in the freed stack space and a location address for a second value in the freed stack space.

As an alternative option, the ROP exploitation detection function of the computer device is arranged to compare the code location with one of a number of location addresses for values in the freed stack space.

According to a fourth aspect, there is provided a computer program, comprising computer readable code which, when run on a computer device, causes the computer device to perform the method described above in the first aspect.

As an option, the computer programme when run on the computer device, causes the computer device to determine, prior to establishing a hooking rule, that the electronic file does not use ASLR.

According to a fifth aspect, there is provided a computer program product comprising a computer readable medium and a computer program as described above in the third aspect, wherein the computer program is stored on the computer readable medium.

DETAILED DESCRIPTION

Figure 1:
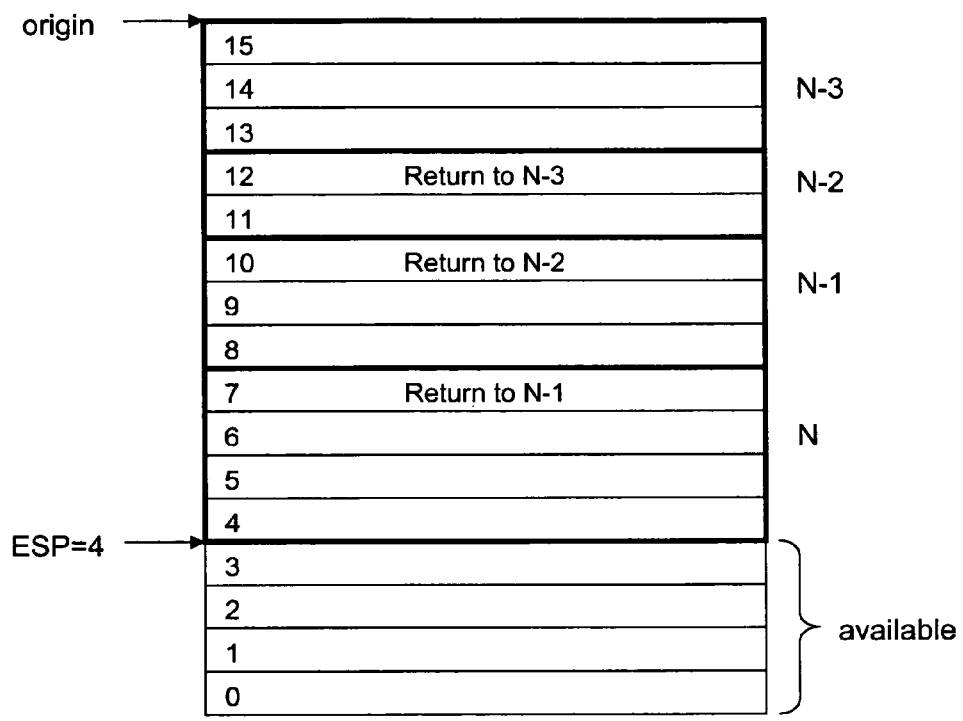
FIG. 1 illustrates schematically in a data stack.

In order to better understand the invention, it is helpful to consider a known stack data structure as illustrated in FIG. 1. A stack is an abstract data structure that operates using a last in, first out principle. Two operations can be performed on a stack; a push operation that adds data to the stack, hiding any items already in the stack, and a pop operation that removes an item from the stack and returns it to a caller. A pop operation reveals previously concealed data. In the example of FIG. 1, four frames are shown (denoted by N, N-1, N-2 and N-3), and the remaining space is available stack space. The active frame N includes data and a location address for the previous frame, N-1, and is located by a stack pointer (ESP). A push operation adds another set of data to the stack in the available space at the location pointed to by the ESP, and the value of the ESP is decreased to the new stack pointer location. Furthermore, frame N becomes frame N-1. A pop operation removes frame N from the stack, revealing frame N-1 (which now becomes frame N) and changing the stack pointer value to 8. A ret operation gets a value from the ESP address into the EIP and starts executing that EIP address. It then pops a return address from the stack.

Normally when an application calls a vulnerable subroutine, the call instruction that performs the control transfer to the subroutine stores a return address into the stack. The return address points to a location after the just-called instruction call to the subroutine. At the end of the subroutine there is normally an execution of ret instruction that transfers the execution back to the caller, which typically pops the stored return address from the stack to the EIP register.

If an exploit is successfully able to modify the return address of the subroutine to point elsewhere than to the caller, for example it now points to a function named VirtualProtect. If we have hooked VirtualProtect we can compare the address of VirtualProtect to the address in the freed stack space (it is called freed stack space as the ret instruction changes the value(s) of the ESP register to indicate it is freed). If the compared addresses are the same then ROP is assumed to be in use.

Figure 2:
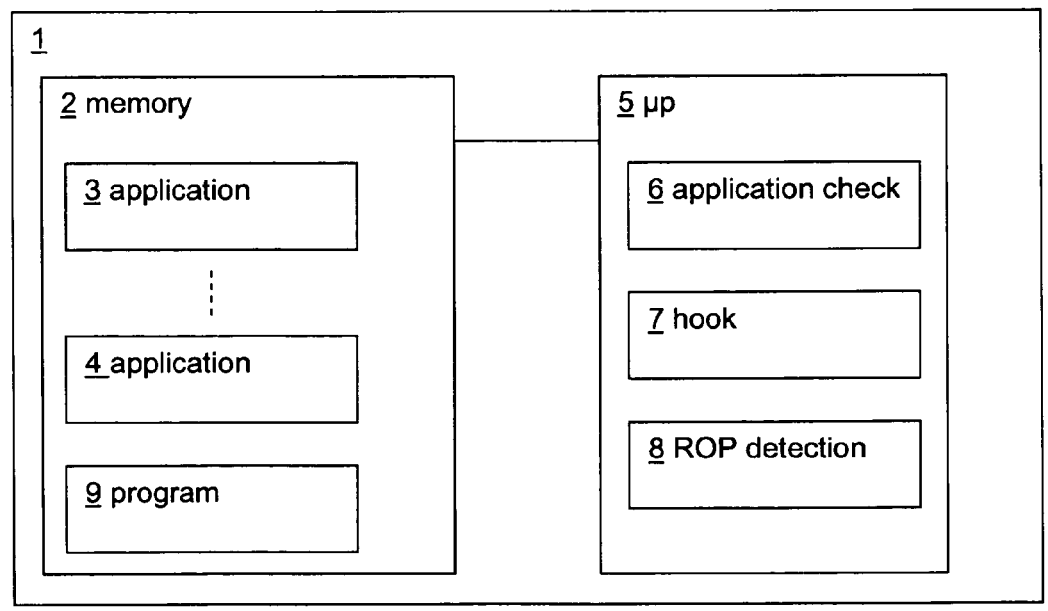
FIG. 2 illustrates schematically in a block diagram a computer device according to an embodiment of the invention.

Referring to FIG. 2 herein, there is illustrated a computer device 1. The computer device may be any type of computer device, such as a personal computer, laptop, smartphone, mobile phone and so on. The computer device has a computer readable medium in the form of a memory 2. The memory is used to store at least one application (two applications 3, 4 are shown).

A processor 5 is provided that can manipulate data in the memory 2. For ease of visualisation, three functions are shown within the processor; it will be appreciated that these may be hardware implemented or simply software routines run by the processor 4. These functions include an application checker 6, a hooking function 7 and an ROP detection function 8.

The memory may also store a computer program 9 which, when executed by the processor 5, causes the processor 5 to perform the method described below.

Figure 3:
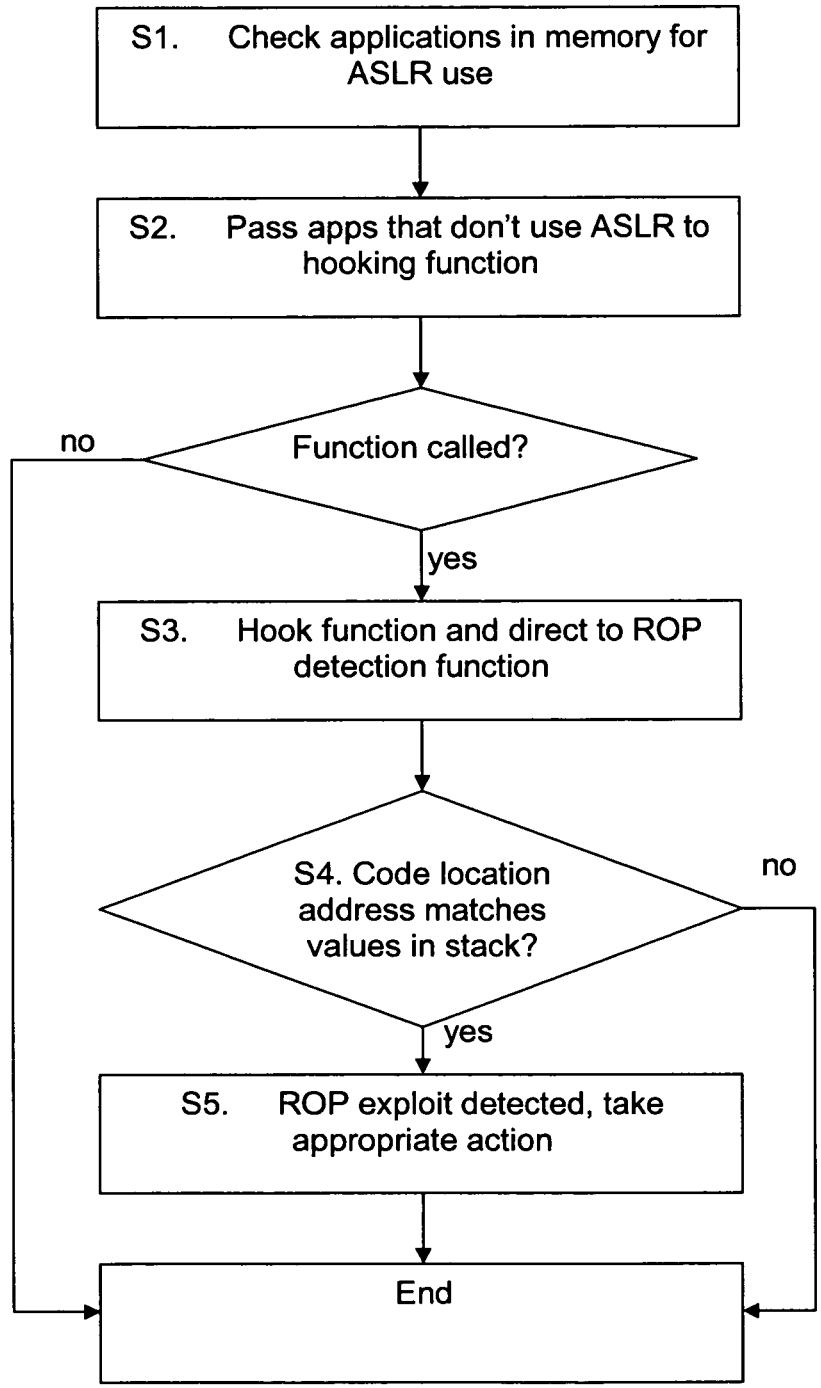
FIG. 3 is a flow diagram showing steps according to an embodiment of the invention.

An embodiment of the invention is now described with reference to FIG. 3 herein. The following numbering corresponds to the numbering of FIG. 3:

S1. The application checker 6 is used to make a check of the applications 3, 4 stored in the memory 2, and in particular whether any resources used by the applications, such as dynamic link libraries (DLLs) use ASLR. In a Windows operating system, this can be done by checking to see whether those resources were compiled using the /DYNAMICBASE linker option, which modifies the header of a resource such as a DLL or executable file to indicate whether the application should use ASLR. Note that steps S1 and S2 are optional for an embodiment in which only applications that don't use ASLR are analysed. In another embodiment, ROP exploit detection can be performed even where ASLR is used.

S2. If it is determined that some of the resources do not use ASLR, then this information is passed to the hooking function, which establishes a hooking rule to ensure that all the relevant functions of such resources are hooked. Alternatively, any resource may be passed to a hooking function, even if they do use ASLR.

S3. If the application calls a hooked function (in other words, a control transfer of a code location is detected), the execution is redirected to the ROP detection function. When hooking and redirecting to the ROP detection function, care must be taken not to amend the content of the freed stack space. The start of the freed stack space may be denoted by a value of the ESP register. This may be achieved by, for example, using jump instructions, or by introducing code into the hooked function that saves the EBP and ESP values or copies enough data from freed stack space elsewhere, for example in a preallocated heap memory.

S4. The stack is inspected to determine values in the freed stack space (in other words, starting from the beginning of the current stack pointer address) and these are compared to the address of the hooked code location. If the values do not match, then it is assumed that the function was called in accordance of the legitimate application execution, whereas if the values do match then an assumption is made that a ROP exploit is being used.

S5. If an ROP exploit is detected, appropriate action may be taken. For example, the application may be terminated, and in addition the user of the computer device may be presented with a message that an ROP exploit has been detected and prevented. A message may be sent to an operator informing it that an attempted exploit has taken place.

Note that the method relies on there being no changes to the stack between the execution of ret-instruction and control transfer to the hooked function.

Note that there are different types of return instructions, and this should be taken into account when searching for hooked function addresses from the freed stack space. By way of example, in a 32 bit operating system, the following should be considered:

Inspection of the stack is done by comparing values in the freed stack space to the address of the function that was just called. Different types of return instructions can lead to a different theoretical maximum amount of comparisons being required. By way of example, in a 32-bit environment, the following should be considered:

"Near return" (C3). An ROP exploit that uses this type of return can be detected by checking the first value in the freed stack space (the ESP).

"Far return" (CB). An ROP exploit that uses this type of return can be detected by checking the second value in the freed stack space. The first value is a segment selector and second is the address. As described above, if the address is the same as the hooked function address then it can be assumed that an attempted ROP exploit is taking place.

"Near immediate return" (C2 iw). An ROP exploit that uses this type of return can be detected by scanning an arbitrary amount of values in the freed stack space for the matching address value. This can be done by scanning a maximum number of bytes that the C2 ret instruction is able to pop from the stack.

"Far immediate return" (CA iw). An ROP exploit that uses this type of return can be detected by scanning 2+(2^16−1)/sizeof(address) values from the freed stack space for the matching hooked function address value.

Where an arbitrary amount of blocks is to be scanned, as described above for the near immediate return and the far immediate return, it may not be necessary to scan the maximum amount of 16385 elements from the freed stack space.

Figure 4:
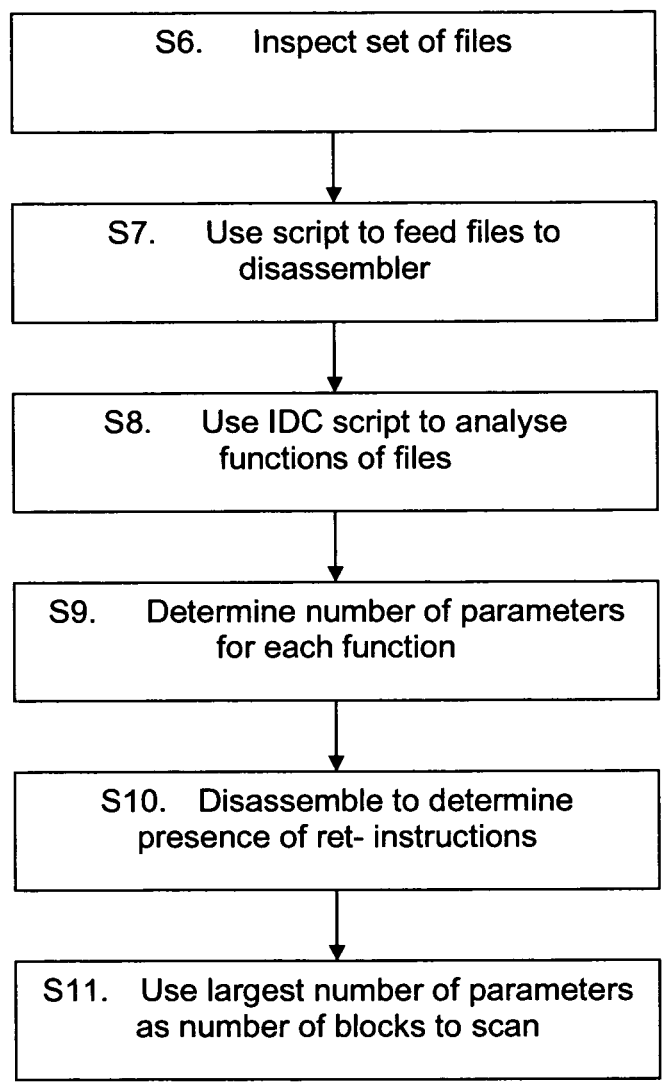
FIG. 4 is a flow diagram showing steps according to a further embodiment of the invention.

This is because very few called functions would use that many parameters. Referring to FIG. 4 herein, steps are shown that allow a reasonable estimate to be made of the number of parameters to be scanned. The following numbering corresponds to that of FIG. 4:

S6. A set of candidate files is inspected. Examples of such files in a typical Windows operating system installation include Portable Executable (PE) files used by applications such as Firefox, Adobe Acrobat Reader and so on. Other operating systems may use other types of files. It is possible that all running processes are inspected, regardless of whether or not the files use ASLR.

S7. A script is created that feeds the PE files to a disassembler such as IDA Pro.

S8. The disassembler uses IDC scripts to analyse the functions of each inspected PE file.

S9. The IDA using IDC scripts determines the number of parameters for each function used by the inspected PE file.

S10. Each function is disassembled to determine the presence of ret-instructions, and the parameter associated with the ret-instruction.

S11. It is determined which PE file of all the PE files inspected has functions that call the largest number of parameters, and the larger of this number and the number determined in step S9 is used as an estimate for the number of blocks to scan.

There is a chance that where a ROP exploit is not taking place, freed stack space will contain the address of the newly called function. This would give false positive, suggesting to the ROP detection function that an ROP exploit is taking place even where this is not the case. This may happen, for example, if at some time before this function is called, code called GetProcAddress for that function, and the value was not overwritten from the stack before function in question was called.

However, the probability of such an address value being in the freed stack space is low. If, for example, the vulnerable function in question is VirtualProtect, a positive detection of an ROP exploit would not necessarily arise even if there was GetProcAddress call for that function from any module. The GetProcAddress call would have to be the vulnerable module (for example CoolType.dll or BIB.dll) that didn't use ASLR. Such functions are normally resolved at the run time from their original modules.

While the above method describes hooking a code location relating to an electronic file in order to detect when a control transfer of a code location is detected, there are other ways in which such a control transfer may be detected. If a control transfer of the code location is detected, then as described above, a destination code location address is compared with values in the freed stack pace. If the code location address and any of the values in the freed stack match, then determining that the control transfer of the code location probably relates to a ROP exploitation.

One way to detect a control transfer of a code location is to mark the code location relating to the electronic file as non-paged. An exception error occurs when the control transfer attempts to transfer the code location to non-paged memory location, and this can be detected. The term "non-paged" refers to the fact that the page is, for example, on disk rather than in the memory. The Operating System must first read it from the disk before it can be executed by the CPU. Pages are put on disk, for example if insufficient RAM is available and there are many programs running but idle. The memory of the idle programs is then put to disk, if those are not used for a while. By forcing all of protected modules or code parts to be non-paged, execution of code in those pages can be detected.

Note that non-paged code pages can in reality still be in stored memory, but are marked as non-paged in order to detect execution of code in those pages.

Another way to detect a control transfer of a code location is to mark the code location relating to the electronic file as not having execute rights. Again, when a control transfer of a code location is attempted, a page fault is induced which allows detection of the control transfer.

The invention allows the detection of an ROP exploit that evades DEP even where a resource such as a library or executable does not use ASLR. Various embodiments and possible uses for the invention have been described above, but it will be appreciated by a person of skill in the art that various modifications may be made to the above-described embodiments without departing from the scope of the invention as defined by the appended claims. Of course, it will be appreciated that the invention may be used even in circumstances where the resource does use ASLR.

The invention claimed is:

1. A method of detecting a Return Oriented Programming exploitation of an application, the method comprising, at a computer device:
   establishing a hooking rule to hook a code location relating to an electronic file stored in a computer readable medium in the form of a memory;
   in the event that a control transfer of the code location relating to the electronic file is detected, comparing a code location address with values in a stack space freed by the control transfer, wherein the comparison of the code location address is made with one of a number of location addresses for values in the freed stack space, the method further comprising:
      estimating the number of location addresses to be compared with the code location address, wherein the estimation is performed by:
         determining a set of electronic files to inspect;
         disassembling each electronic file to analyze functions related to each electronic file;
         determining a number of parameters related to each function;
         determining the function having the highest number of parameters; and
         using the number of parameters for the function with the highest number of parameters as the estimate for the number of location addresses to be compared with the code location address; and,
   in the event that the code location address and any of the values in the freed stack match, determining that the control transfer relates to a Return-Oriented Programming exploitation.

2. The method according to claim 1, wherein a function has a stack pointer having a value, and the hooking is performed so as maintain the same value for the stack pointer.

3. The method according to claim 1, wherein the comparison of the code location address is made with at least one of; a location address for a first value in the freed stack space and a location address for a second value in the freed stack space.

4. The method according to claim 1, further comprising:
   determining the function having the highest number of parameters associated with return instructions; and
   using the number of parameters for the function having the highest number of parameters associated with return instructions as the estimate for the number of location addresses to be compared with the code location address.

5. The method according to claim 1, further comprising: prior to establishing a hooking rule to hook a function relating to an electronic file, determining that the electronic file does not use Address Space Layout Randomization.

6. The method according to claim 5, wherein the step of determining that the electronic file stored in a computer readable medium in the form of a memory does not use Address Space Layout Randomization comprises determining whether the electronic file was compiled using a /DYNAMICBASE linker option.

7. The method according to claim 1, further comprising taking action to prevent the Return-Oriented Programming exploitation.

8. A computer program, stored in a non-transitory medium comprising computer readable code which, when run on a computer device, causes the computer device to perform the method of claim 1.

9. The computer program according to claim 8 which, when run on the computer device, causes the computer device to determine, prior to establishing a hooking rule, that the electronic file does not use Address Space Layer Randomization.

10. A computer program product comprising a computer readable non-transitory medium and a computer program according to claim 8, wherein the computer program is stored on the computer readable non-transitory medium.

11. A method of detecting a Return-Oriented Programming exploitation, the method comprising, at a computer device:
   establishing a mechanism to detect a control transfer of a code location in a memory, the code location relating to an electronic file;
   in the event that a control transfer of the code location is detected, comparing a destination code location address with values in a freed stack space, wherein the comparison of the destination code location address is made with one of a number of location addresses for values in the freed stack space, the method further comprising:
      estimating the number of location addresses to be compared with the destination code location address wherein the estimation is performed by:
         determining a set of electronic files to inspect;
         disassembling each electronic file to analyze functions related to each electronic file;
         determining a number of parameters related to each function;
         determining the function having the highest number of parameters; and
         using the number of parameters for the function with the highest number of parameters as the estimate for the number of location addresses to be compared with the destination code location address; and,
   in the event that the destination code location address and any of the values in the freed stack space match, determining that the control transfer of the code location relates to a Return-Oriented Programming exploitation.

12. The method according to claim 11, wherein the mechanism to detect the control transfer of the code location comprises:
   marking the code location relating to the electronic file as not being present in the memory;
   detecting an exception error when the control transfer attempts to transfer the code location to a memory location.

13. The method according to claim 11, wherein the mechanism to detect the control transfer of the code location comprises:
   marking the code location relating to the electronic file as not being executable;

detecting an exception error when the control transfer attempts to transfer the code location to a memory location.

14. A computer device comprising:
a computer readable medium in the form of a memory;
at least one electronic file stored on the memory;
a hooking function for establishing a hooking rule to hook a code location relating to the electronic file;
a Return-Oriented Programming exploitation detection function for comparing a code location address with values in a stack space freed by a control transfer, wherein the comparison of the code location address is made with one of a number of location addresses for values in the freed stack space, the method further comprising:
estimating the number of location addresses to be compared with the code location address, wherein the estimation is performed by:
determining a set of electronic files to inspect;
disassembling each electronic file to analyze functions related to each electronic file;
determining a number of parameters related to each function;
determining the function having the highest number of parameters; and
using the number of parameters for the function with the highest number of parameters as the estimate for the number of location addresses to be compared with the code location address; and,
in the event that the code location address and any of the values in the freed stack space match, determining that the control transfer relates to a Return-Oriented Programming exploitation.

15. The computer device according to claim 14, further comprising an application checking function for determining that the electronic file does not use Address Space Layout Randomization.

16. The computer device according to claim 14, wherein the Return-Oriented Programming exploitation detection function is arranged to compare the code location address with at least one; of a location address for a first value in the freed stack space and a location address for a second value in the freed stack space.

17. The computer device according to claim 14, wherein the Return-Oriented Programming exploitation detection function is arranged to compare the code location address with one of the number of location addresses for values in the freed stack space.

* * * * *